US007453043B2

(12) United States Patent
Park et al.

(10) Patent No.: US 7,453,043 B2
(45) Date of Patent: Nov. 18, 2008

(54) COMPOSITION FOR MANUFACTURING INSULATION MATERIALS OF ELECTRICAL WIRE AND ELECTRICAL WIRE MANUFACTURED USING THE SAME

(75) Inventors: Do-Hyun Park, Gyeonggi-do (KR); Il-Gun Seo, Gyeonggi-do (KR)

(73) Assignee: LS Cable Ltd., Seoul (KR)

( * ) Notice: Subject to any disclaimer, the term of this patent is extended or adjusted under 35 U.S.C. 154(b) by 55 days.

(21) Appl. No.: 11/703,412

(22) Filed: Feb. 6, 2007

(65) Prior Publication Data

US 2007/0187130 A1 Aug. 16, 2007

(30) Foreign Application Priority Data

Feb. 15, 2006 (KR) ..................... 10-2006-0014778

(51) Int. Cl.
*H01B 7/00* (2006.01)

(52) U.S. Cl. ............................. 174/110 R; 174/120 R; 174/120 SR

(58) Field of Classification Search ............. 174/110 R, 174/120 R, 120 SR, 110 AR, 110 FC
See application file for complete search history.

(56) References Cited

U.S. PATENT DOCUMENTS

| | | | | |
|---|---|---|---|---|
| 5,827,587 | A * | 10/1998 | Fukushi | 428/36.6 |
| 6,147,309 | A * | 11/2000 | Mottine et al. | 174/110 PM |
| 6,362,418 | B1 * | 3/2002 | Grandy et al. | 174/36 |
| 6,392,152 | B1 * | 5/2002 | Mottine et al. | 174/110 PM |
| 6,441,308 | B1 * | 8/2002 | Gagnon | 174/105 R |
| 2005/0056454 | A1 * | 3/2005 | Clark | 174/113 R |

* cited by examiner

*Primary Examiner*—William H Mayo, III
(74) *Attorney, Agent, or Firm*—Jones Day

(57) ABSTRACT

A composition for manufacturing insulation materials of an electrical wire having a multilayer structure, which is used for manufacturing a first insulation coating layer made of a composition including a predetermined base resin, an antioxidant and a co-crosslinking agent so as to surround a conductor or a conductor bundle for an electrical wire; a second insulation coating layer made of a composition including a base resin polyvinylidene fluoride (PVDF), a predetermined antioxidant and a co-crosslinking agent so as to surround the first insulation coating layer, and an electrical wire manufactured using the same.

10 Claims, 1 Drawing Sheet

100
110
120
130

COMPOSITION FOR MANUFACTURING INSULATION MATERIALS OF ELECTRICAL WIRE AND ELECTRICAL WIRE MANUFACTURED USING THE SAME

BACKGROUND OF THE INVENTION

1. Field of the Invention

The present invention relates to a composition for manufacturing insulation materials of an electrical wire having a multilayer structure of at least two layers, and an electrical wire manufactured using the same, and more specifically to a composition for manufacturing insulation materials of an electrical wire in which an inner layer is made of a composition using, as a base resin, a blended mixed resin including a polyethylene-based resin and an outer layer, attached to the inner layer while surrounding the inner layer, is made of a composition using polyvinylidene fluoride as a base resin, and an electrical wire manufactured using the same.

2. Description of the Related Art

Insulation materials of an electrical wire having a two-layer structure of an inner layer composed of polyolefin and an outer layer composed of polyvinylidene fluoride (PVDF) have been commercially used in various fields for a long time, and it is apparent to those skilled in the art that the insulation materials may be easily purchased from related manufacturers. However, these conventional products have a problem that an inner layer and an outer layer may be easily peeled from each other due to an insufficient adhesive force between them. Specifically, cracks may be generated in the outer layer, and more seriously the outer layer may be peeled from the inner layer if the outer layer is exposed to a mechanical stress from an outside environment, or exposed to a predetermined fluid, for example if the outer layer is contacted with sharp-edged substances or gets impacts. Also, since a close adhesion is not made between the inner layer and the outer layer, a resistance against wrinkling is weak, and a resistance against wear or bending fatigue of an insulator are adversely affected upon bending. Accordingly, there has been required an improved technique for enhancing the close adhesion.

Recently, there have been many attempts to solve the various problems presented in the conventional products as described previously in Korean Patent Publication No. 2001-79751. The above-mentioned disclosure has an advantage that an interlayer adhesive force between an inner layer and an outer layer may be improved in an insulation layer manufactured with two layers, but it was revealed that mechanical properties of the manufactured electrical wire are deteriorated, and a withstanding voltage characteristic after heating and a peeling caused by an excessively strong adhesion are also poor.

Accordingly, there have been ardent attempts to solve the problems in the related art as well as to improve an interlayer adhesive force of an insulation material for coating an electrical wire manufactured with a multi-layer structure of at least two layers, and therefore the present invention was designed based on the above-mentioned facts.

SUMMARY OF THE INVENTION

The present invention is designed to solve the above problems that an interlayer adhesive force of insulation materials for coating an electrical wire manufactured with a multi-layer structure of at least two layers is weak; a resistance against wrinkling upon bending is weak, the wrinkling being caused since these coating layers is not closely attached to each other; a resistance against wear or bending fatigue of an insulator is deteriorated; a mechanical property of an insulated electrical wire manufactured using the insulation materials is deteriorated; a withstanding voltage characteristic after heating is poor; and a peeling caused by an excessively strong adhesion is not easily made, and therefore it is an object of the present invention to provide a composition for manufacturing insulation materials of an electrical wire which is light-weight and excellent in mechanical properties and a thermal resistance, and especially may maintain physical properties at a high temperature of at least 150° C. for a long time, and an electrical wire manufactured using the same.

In order to accomplish the above object, the present invention provides a composition for manufacturing insulation materials of an electrical wire having a multilayer structure, which is used for manufacturing a first insulation coating layer manufactured with a composition including a predetermined base resin, an antioxidant and a co-crosslinking agent so as to surround a conductor or a conductor bundle for an electrical wire; a second insulation coating layer manufactured with a composition including a base resin polyvinylidene fluoride (PVDF), a predetermined antioxidant and a co-crosslinking agent so as to surround the first insulation coating layer, and an electrical wire manufactured using the same.

BRIEF DESCRIPTION OF THE DRAWINGS

The accompanying drawings is just shown for the purpose of illustrations of preferred embodiments of the present invention, and for better understandings of technical aspects of the present invention in combination with the detailed description of the present invention as described later, and therefore it should be understood that the present invention should not be construed as limited to the accompanying drawings. In the drawings.

DESCRIPTION OF THE PREFERRED EMBODIMENT

Figure 1:
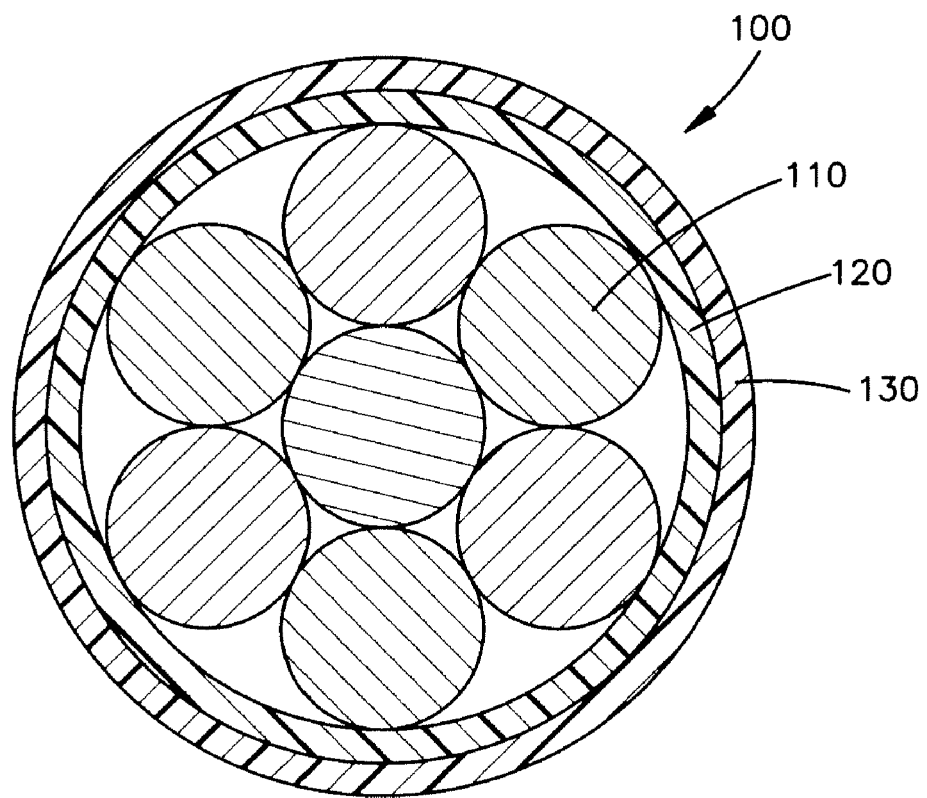
FIG. 1 is a cross-sectional view illustrating a wire surrounded by an insulation layer having a multilayer structure of inner and outer layers of the wire manufactured using a composition according to the present invention.

Hereinafter, preferred embodiments of the present invention will be described in detail with reference to the accompanying drawings for the purpose of better understandings. However, the description proposed herein is just a preferable example for the purpose of illustrations only, not intended to limit the scope of the invention, so it should be understood that other equivalents and modifications could be made thereto without departing from the spirit and scope of the invention. Preferred embodiments of the present invention are provided to describe the present invention more fully, as apparent to those skilled in the art.

A composition for manufacturing insulation materials of an electrical wire is preferably used herein, the composition being used for manufacturing a first insulation coating layer made of a composition including a predetermined base resin, an antioxidant and a co-crosslinking agent so as to surround a conductor or a conductor bundle for an electrical wire; a second insulation coating layer made of a composition including a base resin polyvinylidene fluoride (PVDF), a predetermined antioxidant and a co-crosslinking agent so as to surround the first insulation coating layer.

A mixed resin (a1) in which 2 to 20% by weight of an ethylene copolymer resin is blended with 80 to 98% by weight of polyethylene may be used as the base resin in the composition for manufacturing the first insulation coating layer. At this time, an effect on improvement of an adhesive force to a secondary insulator may not be attained if the content of the ethylene copolymer in the mixed resin (a1) is less than the lower numerical limit, while an easy peeling may not be made due to a strong adhesive force if the content exceeds the upper numerical limit. In particular, adhesion to the secondary insulator may not be made if polyethylene is used alone, but the objects of the present invention may be sufficiently accomplished if polyethylene is used in combination with a suitable amount of an ethylene copolymer resin.

A mixed resin (a2) in which 2 to 20% by weight of a modified ethylene copolymer resin grafted with a maleic anhydride is blended with 80 to 98% by weight of polyethylene may be used as the base resin in the composition for manufacturing the first insulation coating layer. At this time, an adhesion to a secondary insulator may not be sufficiently accomplished if the content of the modified ethylene copolymer resin grafted with a maleic anhydride in the mixed resin (a2) is less than the lower numerical limit, while an easy peeling may not be made since an adhesion gets stronger as a content of polar groups increases if the content exceeds the upper numerical limit.

A mixed resin (a3) in which 5 to 30% by weight of a modified polyethylene is blended with 70 to 95% by weight of polyethylene may be used as the base resin in the composition for manufacturing the first insulation coating layer. If the content of the modified polyethylene in the mixed resin (a3) is less than the lower numerical limit, a sufficient adhesive force to a secondary insulator may not be accomplished due to a very low content of polar groups, and a secondary insulator is peeled off when a wire is bent at an angle of at least 90°, which results in a whitening phenomenon in the bent region, while an esay peeling may not be made since an adhesion gets much stronger as a content of polar groups significantly increases in the modified polyethylene resin if the content exceeds the upper numerical limit.

A mixed resin (a4) in which 2 to 30% by weight of a modified ethylene copolymer resin grafted with a maleic anhydride is blended with 50 to 80% by weight of polyethylene and 2 to 20% by weight of an ethylene copolymer resin may be used as the base resin in the composition for manufacturing the first insulation coating layer. A sufficient adhesive force to a secondary insulator may not be accomplished due to a very low content of polar groups if each of the contents of the ethylene copolymer resin and the modified ethylene copolymer resin grafted with a maleic anhydride in the mixed resin (a4) is less than the lower numerical limit, while an easy peeling may not be made since an adhesion gets much stronger as a content of polar groups significantly increases if the content exceeds the upper numerical limit.

A mixed resin (a5) in which 5 to 40% by weight of modified polyethylene is blended with 60 to 95% by weight of an ethylene copolymer resin may be used as the base resin in the composition for manufacturing the first insulation coating layer. The numeral limit concerning a blending ratio of the components in the mixed resin (a5) is within an optimal condition to improve an adhesive force between a primary insulator and a secondary insulator, but the equivalent problems as described above may be caused if the blending ratio is out of the numeral limit.

The polyethylene, blended in the mixed resins (a1), (a2), (a3) and (a4) selected as the base resin in the composition for manufacturing the first insulation coating layer, is preferably at least one material selected from the group consisting of, but is not limited to, linear low-density polyethylene (LLDPE), medium-density polyethylene (MDPE), high-density polyethylene (HDPE) and an ethylene/octene copolymer resin, and has a specific gravity of 0.922 to 0.945 g/cm$^3$. Meanwhile, the polyethylene of the mixed resins (a1), (a2), (a3) and (a4) preferably has a melt index (MI) of 0.1 to 2.5 g/10min. An elongation and an extrusion processability may be deteriorated if the melt index of the polyethylene is less than the lower numerical limit, and a tensile strength may be deteriorated if the content exceeds the upper numerical limit.

The ethylene copolymer resin blended in the mixed resins (a1), (a4) and (a5) selected as the base resin in the composition for manufacturing the first insulation coating layer is preferably at least one material selected from the group consisting of ethylene vinyl acetate (EVA), ethylene methyl acrylate (EMA), ethylene ethyl acrylate (EEA) and ethylene butyl acrylate (EBA), wherein the ethylene vinyl acetate has an introduced vinyl acetate content of 0.1 to 50% by weight; the ethylene methyl acrylate has an introduced methyl acrylate content of 0.1 to 33% by weight; the ethylene ethyl acrylate has an introduced ethyl acrylate content of 0.1 to 28% by weight; and the ethylene butyl acrylate has an introduced butyl acrylate content of 0.1 to 33% by weight. At this time, vinylacetate (VA), ethylacrylate (EA), methylmethyl methacrylate (MMA) and butylacrylate (BA) except for the ethylene in the ethylene-based copolymer resin are required for the purpose of improving compatibility with a flame retardant by enhancing an intramolecular polarity, and it may be difficult to ensure a flame retardancy since a suitable amount of a flame retardant may not be filled if the content of the component improving intramolecular polarity is less than the lower numerical limit, while mechanical properties such as tensile strength, elongation and wear resistance may be deteriorated and a dispensity and extrusion property may be deteriorated since the melt index is out of the range if the content exceeds the upper numerical limit. Ethylene vinyl acetate, ethylene methyl acrylate, ethylene ethyl acrylate, ethylene butyl acrylate and the like are preferably used as the ethylene copolymer resin in the mixed resins (a1), (a4) and (a5), and in particuar among the ethylene copolymer resins, ethylene ethyl acrylate or ethylene methyl acrylate having an excellent stability to thermal decomposition at a high temperature of at least 300° C. is more preferably used herein.

The modified polyethylene blended in the mixed resins (a3) and (a5) selected as the base resin in the composition for manufacturing the first insulation coating layer is preferably a material in which at least one material selected from the group consisting of high-density polyethylene, medium-density polyethylene, linear low-density polyethylene, low-density polyethylene and an ethylene/octene/butene terpolymer resin is grafted with one selected from the group consisting of maleic anhydride, glycidyl, acrylic acid and the like.

The modified ethylene copolymer resin blended in the mixed resins (a2) and (a4) selected as the based resin in the composition for manufacturing the first insulation coating layer is preferably a material in which at least one material selected from the group consisting of ethylene vinyl acetate (EVA), ethylene methyl acrylate (EMA), ethylene ethyl acrylate (EEA) and ethylene butyl acrylate (EBA) is grafted with one selected from the group consisting of maleic anhydride, glycidyl methacrylate, acrylic acid and the like.

Preferably, the modified polyethylene of the mixed resins (a3) and (a5), grafted with a maleic anhydride and the like as decrribed above, and the modified ethylene copolymer resin in the mixed resins (a2) and (a4) may improve an adhesive force to a secondary insulator, prevent the secondary insulator from being peeled off when a wire is bent at an angle of at least 90°, and inhibit a whitening phenomenon occurring in the bent region.

The antioxidant in the composition for manufacturing the first insulation coating layer and the second insulation coating layer is preferably a mixture of at least two components selected from the group consisting of hindered phenol-based, phosphate-based, imidazole-based and sulphur-based antioxidants, and is included at a content of 2 to 35 parts by weight on the basis of 100 parts by weight of the base resin. A thermal resistance may be poor since a sufficient effect of the antioxidant is not attained if the content of the antioxidant is less than the lower numerical limit, while an effect of the antioxidant may not be proportionally improved according to an amount of the added antioxidant, but on the contrary an economical efficiency may be lowered due to its increasing amount if the content exceeds the upper numerical limit.

The co-crosslinking agent in the composition for manufacturing the first insulation coating layer and the second insulation coating layer is preferably a cyanurate-based or methacrylate-based co-crosslinking agent, and included in a content of 1 to 10 parts by weight on the basis of 100 parts by weight of the base resin. At this time, the cyanurate-based co-crosslinking agent is preferably triallyl isocyanurate, and the methacrylate-based co-crosslinking agent is preferably trimethylopropanemethacrylate. It may be difficult to ensure desired physical properties since a sufficient crosslinking may not be accomplished if the content of the crosslinking agent is less than the lower numerical limit, while an insulating property may be deteriorated since a volume resistivity may be lowered by an excessive by-product produced in the crosslinking reaction if the content exceeds the upper numerical limit.

The composition for manufacturing the first insulation coating layer and the second insulation coating layer may further include at least one material selected from the group consisting of a flame retardant, a lubricant and a processing aid.

The flame retardant is preferably at least one material selected from the group consisting of antimony peroxide, magnesium hydroxide and aluminium hydroxide, and included at a content of 2 to 20 parts by weight on the basis of 100 parts by weight of the base resin. A flame retardancy may not be ensured if the content of the flame retardant is less than the lower numerical limit, while an effect of the flame retardancy may not be proportionally imporved according to an amount of the added flame retardancy, but on the contrary physical properties of a product may be deteriorated as well as an economical efficiency may be lowered due to its increasing amount if the content exceeds the upper numerical limit.

Polyolefin wax, paraffin wax, paraffin oil, steric acid, metallic soap, organic silicon, fatty acid ester, fatty acid amide, fatty alcohol, fatty acid or the like may be used as the lubricant. The lubricant is preferably included at a content of 2 to 5 parts by weight on the basis of 100 parts by weight of the base resin. Processability may not improved due to a reduced viscosity of the used materials if the content of the lubricant is less than the lower numerical limit, while a flame retardancy, a low smoke and a tensile strength may de deteriorated if the content exceeds the upper numerical limit.

Polyolefin wax, paraffin wax, paraffin oil, steric acid, metallic soap, organic silicon, fatty acid ester, fatty acid amide, fatty alcohol, fatty acid or the like may be used as the processing aid, and the processing aid may be optionally used in combination with the lubricant, if necessary. The processing aid is preferably included at a content of 0.5 to 4 parts by weight on the basis of 100 parts by weight of the base resin. Flowability may be poor due to an adhesive force between a material and a metallic surface during an extrusion process and processability may not be improved due to a reduced viscosity of the used materials if the content of the processing aid is less than the lower numerical limit, while a flame retardancy, a low smoke and a tensile strength may be deteriorated if the content exceeds the upper numerical limit.

Preparation of Test Specimen

Hereinafter, the compositions of Embodiments 1 to 5 and Comparative examples 1 to 3 was prepared, respectively, as listed in the following Table 1, and test samples were prepared using the compositions, respectively.

TABLE 1

| | Embodiments | | | | | Comparative examples | | |
|---|---|---|---|---|---|---|---|---|
| | 1 | 2 | 3 | 4 | 5 | 1 | 2 | 3 |
| Resin a | 80 | 80 | 80 | 60 | 80 | 100 | 20 | 20 |
| Resin b | 20 | 10 | — | 20 | — | — | 80 | — |
| Resin c | — | — | 10 | — | — | — | — | 80 |
| Resin d | — | 10 | 10 | 20 | 20 | — | — | — |
| Flame retardant a | — | — | — | 20 | 20 | 12 | — | 30 |
| Flame retardant b | 6 | 6 | 6 | — | — | — | 6 | — |
| Lubricant | 1.5 | 1.5 | 1.5 | 1.5 | 1.5 | 1.5 | 1.5 | 1.5 |
| Antioxidant | 4.5 | 4.5 | 4.5 | 4.5 | 4.5 | 4.5 | 4.5 | 4.5 |
| Co-crosslinking agent | 3 | 3 | 3 | 3 | 3 | 3 | 3 | 3 |

In Table 1, Resin a represents high-density polyethylene (HDPE), Resin b represents an ethylene ethyl acrylate (EEA) copolymer, Resin c represents an ethylene methyl acrylate (EMA) copolymer, Resin d represents high-density polyethylene grafted with a maleic anhydride, Flame retardant a represents magnesium hydroxide, Flame retardant b represents antimony trioxide, and Co-crosslinking agent represents trimethylopropanetrimethacrylate.

Evaluation of Physical Property

Each of the compositions as listed in Table 1 was mixed in an open roll, and then molded in a press at 170° C. for 20 minutes to obtain test samples as the insulation material, and the test samples were tested for room temperature properties, an insulation resistance, an accelerated aging property, an adhesive strength, as listed in the following Table 2.

TABLE 2

| | | Unit | Evaluation |
|---|---|---|---|
| Room-Temperature Property | Tensile Strength | kgf/mm$^2$ | Room-temperature properties are measured according to IEC-0681-1-1 standard, and a tensile strength should be at least 1.5 kgf/mm$^2$ and an elongation should be at least 160%. |
| | Elongation | % | |
| Volume Resistivity | | $10^{16}$ Ω · cm | A test specimen is measured for a volume resistivity using high resistance meters HP4339B and HP16008B, and its measured value should be at least 1 × $10^{16}$ Ω · cm. |
| Adhesive Strength | | — | A peel strength between an inner layer and an outer layer of an insulation layer is measured according to ASTM B1876-95. A 100 mm wire insulated and coated with a multilayer structure of an inner layer and an outer layer is selected, and then approximately 70% of the total outer insulator is peeled off using a knife, and the remaining 30% of the total outer insulator is measured for a peel strength using a tensile tester. A wire is evaluated not to be good if an outer insulator is not severed but cut off due to an excessive adhesive force, and not to be good due to a poor adhesion if the outer insulator is peeled without increase in load. |
| Accelerated Aging | | — | An insulated and coated wire having a multilayer structure of an inner layer and an outer layer is hanged on both sides of a rod having a diameter of 20 mm, and then a load of 200 g is subject to both sides of the rod, respectively. And, the wire is kept at 250° C. for 240 minutes, and then conducted for a bending test to confirm whether or not cracks are generated when a voltage of AC 2,500 V is applied for 5 minutes. It is evaluated to be good if an internal pressure is not generated and not to be good if if an internal pressure is generated. |

Result of Physical Property

The evaluation results on the physical properties of the test samples according to Table 2 are listed in the following Table 3. In the following Table 3, measured values of the physical properties are represented by the same units as listed in Table 2.

TABLE 3

| | Embodiments | | | | | Comparative examples | | |
|---|---|---|---|---|---|---|---|---|
| | 1 | 2 | 3 | 4 | 5 | 1 | 2 | 3 |
| Tensile Strength | 1.72 | 1.88 | 1.85 | 1.75 | 1.81 | 1.81 | 1.42 | 1.33 |
| Elongation | 296 | 288 | 311 | 261 | 250 | 361 | 324 | 352 |
| Volume Resistivity | 11.24 | 9.75 | 9.44 | 7.74 | 10.49 | 28.14 | 0.76 | 0.84 |
| Adhesive Strength | Good | Good | Good | Good | Good | Not good | Not good | Not good |
| Acclerated Aging | Good | Good | Good | Good | Good | Good | Not good | Not good |

Concerning the evaluation results on the adhesive strength as listed in Table 3, the test sample of Comparative example 1 was proven not to be good since peeling does not occur due to an excessive adhesion between the inner layer and the outer layer, and the test samples of Comparative examples 2 and 3 were proven not to be good since peeling easily occurs without increase in load due to a poor adhesion.

As seen in Table 3, it was revealed that, in the case of Embodiment 1, the insulation materials constituting the inner layer maintains a mechanical strength and satisfies insulation resistance since the insulation materials are mixed with high-density polyethylene and ethylene ethyl acrylate, and also has an easy peeling property while maintaining an adhesive force to the base resin, polyvinylidene fluoride, of the insulation materials constituting the outer layer. In the case of Embodiments 2 to 4, it was revealed that the insulation materials constituting the inner layer maintains a sufficient mechanical property by using the high-density polyethylene and the ethylene copolymer, and enhances compatibility to the flame retardant by mixing with the polyethylene grafted with a maleic anhydride. As a result, it was revealed that insulation materials constituting the inner layer has an enhanced mechanical property, and maintains a sufficient adhesive force to the insulation materials constituting the outer layer after the cross-linking reaction as well as has a good peeling property. Especially, it was revealed that an accelerated aging test is conducted on the wire having the multilayer insulation coating layer composed of the inner layer and the outer layer, but a certain internal pressure is not generated in the wire. Meanwhile, it was revealed that, in the case of Embodiment 5, the insulation materials constituting the inner layer enhances a flame retardancy by mixing the high-density polyethylene and the polyethylene grafted with a maleic anhydride to enhance compatibility to the flame retardant, and also maintaines a mechanical strength. Also, it was revealed that a peeling of the outer layer from the multilayer insulation coating layer is good due to the grafting of the polar maleic anhydride.

Meanwhile, as listed in Table 3, the base resin high-density polyethylene was used as the insulation materials of the inner layer, and then the flame retardant, etc. was added to the base resin in the case of Comparative example 1 unlike in Embodiments 1 to 5. It was seen that the base resin high-density polyethylene has an excellent mechanical strength but a poor adhesion to the polyvinylidene fluoride used as the insulation materials of the outer layer, and therefore the cracks occur in the outer insulation layer and peeling is often generated in the inner layer if the wire is subject to a mechanical stress or impulses, or in contact to sharp-edged substances. It was seen that a wear or bending fatigue resistance as well as a resistance against wrinkling in bending (difficulties occur upon sealing a wire and inserting it into a couplet or a grommet) are adversely affected due to this easy interlayer separation between the inner layer and the outer layer. In the case of Comparative example 2, a base resin, obtained by mixing 20 parts by weight of high-density polyethylene with 80 parts by weight of ethyleneethyl acrylate resin having an ethyl acrylate content of 15%, was used as the insulation materials of the inner layer, and an antimony additive was also used herein. As a result, the tensile strength at a room temperature was deteriorated, and the volume resistivity was reduced due to polarity of ethyl acrylate. Meanwhile, it was revealed that a peeling property is not good due to an excessive increase in an adhesive strength to the polyvinylidene fluoride used as the insulation materials of the outer layer, and the cracks occur in the insulation layer of the wire during an accelerated aging test. Finally, the base resins, obtained by mixing 20 parts by weight of high-density polyethylene with 80 parts by weight of ethylene methyl acrylate resin having a methyl acrylate content of 28%, were used as the insulation materials of the inner layer, and 30 parts by weight of metal hydroxide was used as the untreated inorganic flame retardant in the case of Comparative example 3. As a result, it was revealed that the whole evaluation results on a tensile strength at a room temperature, an excessive adhesivity between the inner layer and the outer layer, a volume resistivity and an accelerated aging test are not satisfactory.

Preparation Example of Wire

Wires having a configuration as shown in FIG. 1 were prepared, respectively, using the polymeric compositions of electrical wires as listed in Table 1.

FIG. 1 is a cross-sectional view illustrating a wire surrounded by an insulation layer having a multilayer structure of inner and an outer layers of the wire manufactured using a composition according to the present invention.

A high-densitypolyethylene/ethylene copolymer was used as the base resin in an inner insulation layer 120 which directly surrounds a conductor 110 inside a wire 100, and a mixture, obtained by adding a co-crosslinking agent, an antioxidant, a flame retardant, a processing aid and like to the base resin, was extruded on a conductor under a pressure. An outer insulation layer 130 surrounding the entire inner insulation layer 120 of the wire 100 was extruded on the previously extruded inner insulation layer 120 under a pressure using a mixture obtained by adding a stabilizer, a co-crosslinking agent and an antioxidant to polyvinylidene fluoride. Then, the inner insulation layer 120 and the outer insulation layer 130 were cross-linked to each other by irradiating a laser beam to the wire surrounded by the insulation materials having a multilayer structure of the inner insulation layer 120 and the outer insulation layer 130. As described above, the above-mentioned various materials provided in the present invention may be used for the insulation materials 120, 130 having a multilayer structure and surrounding the wire of FIG. 1, and the base resin is not limited to the above-mentioned materials if the materials have the same effect. Therefore, it should be understood that the technically equivalent scopes will be within the technical spirit and scope previously intended in the present invention, as apparent to those skilled in the art from this detailed description.

As described above, the best embodiments of the present invention are disclosed. Therefore, the specific terms are used in the specification and appended claims, but it should be understood that the description proposed herein is just a preferable example for the purpose of illustrations only, not intended to limit the scope of the invention.

APPLICABILITY TO THE INDUSTRY

If insulation materials were manufactured using the composition for manufacturing insulation materials of an electrical wire according to the present invention and an electrical wire was manufactured using the insulation materials, lightweigh products may be produced, and also an electrical wire or wire products used under a high-temperature environment have advantageous properties since the composition is excellent in a mechanical property and a thermal resistance and capable of maintaining physical properties at a high temperature of at least 150° C. for a long time.

What is claimed is:

1. A composition for manufacturing insulation materials of an electrical wire having a multilayer structure, which is used for manufacturing a first insulation coating layer made of a composition including a base resin, an antioxidant and a co-crosslinking agent so as to surround a conductor or a conductor bundle for an electrical wire; a second insulation coating layer made of a composition including a base resin polyvinylidene fluoride (PVDF), an antioxidant and a co-crosslinking agent so as to surround the first insulation coating layer, wherein the base resin in the composition for manufacturing the first insulation coating layer is at least one mixed resin selected from the group consisting of:

(a1) a mixed resin in which 2 to 20% by weight of an ethylene-based copolymer resin is blended with 80 to 98% by weight of polyethylene;

(a2) a mixed resin in which 2 to 20% by weight of a modified ethylene-based copolymer resin is blended with 80 to 98% by weight of polyethylene;

(a3) a mixed resin in which 5 to 30% by weight of modified polyethylene is blended with 70 to 95% by weight of polyethylene;

(a4) a mixed resin in which 2 to 30% by weight of a modified ethylene copolymer resin is blended with 50 to 80% by weight of polyethylene and 2 to 20% by weight of an ethylene copolymer resin; and (a5) a mixed resin in which 5 to 40% by weight of modified polyethylene is blended with 60 to 95% by weight of an ethylene copolymer resin.

2. The composition for manufacturing insulation materials of an electrical wire according to claim 1, wherein the polyethylene blended in the mixed resins (a1), (a2), (a3) and (a4) selected as the base resin in the composition for manufacturing the first insulation coating layer is at least one material selected from the group consisting of linear low-density polyethylene (LLDPE), medium-density polyethylene (MDPE), high-density polyethylene (HDPE) and an ethylene octene copolymer resin, and has a specific gravity of 0.922 to 0.945 g/cm$^3$ and a melt index (MI) of 0.1 to 2.5 g/10 min.

3. The composition for manufacturing insulation materials of an electrical wire according to claim 1, wherein the ethylene copolymer resin blended in the mixed resins (a1), (a4) and (a5) selected as the base resin in the composition for manufacturing the first insulation coating layer is at least one material selected from the group consisting of ethylene vinyl acetate (EVA), ethylene methyl acrylate (EMA), ethylene ethyl acrylate (EEA) and ethylene butyl acrylate (EBA), wherein the ethylene vinyl acetate has an introduced vinyl acetate content of 0.1 to 50% by weight; the ethylene methyl acrylate has an introduced methyl acrylate content of 0.1 to 33% by weight; the ethylene ethyl acrylate has an introduced ethyl acrylate content of 0.1 to 28% by weight; and the ethylene butyl acrylate has an introduced butyl acrylate content of 0.1 to 33% by weight.

4. The composition for manufacturing insulation materials of an electrical wire according to claim 1, wherein the modified polyethylene blended in the mixed resins (a3) and (a5) selected as the base resin in the composition for manufacturing the first insulation coating layer is a material in which one material selected from the group consisting of maleic anhydride, glycidyl methacrylate and acrylic acid is introduced into at least one material selected from the group consisting of high-density polyethylene, medium-density polyethylene, linear low-density polyethylene, low-density polyethylene and an ethylene/octene/butene terpolymer resin.

5. The composition for manufacturing insulation materials of an electrical wire according to claim 1, wherein the modified ethylene copolymer resin blended in the mixed resins (a2) and (a4) selected as the base resin in the composition for manufacturing the first insulation coating layer is a material in which one material selected from the group consisting of maleic anhydride, glycidyl methacrylate and acrylic acid is introduced into at least one material selected from the group consisting of ethylene vinyl acetate (EVA), ethylene methyl acrylate (EMA), ethylene ethyl acrylate (EEA) and ethylene butyl acrylate (EBA).

6. The composition for manufacturing insulation materials of an electrical wire according to claim 1, wherein the antioxidant in the composition for manufacturing the first insulation coating layer and the second insulation coating layer is a mixture of at least two compounds selected from the group consisting of hindered phenol-based, phosphate-based, imidazole-based and sulphur-based antioxidants, and is included at a content of 2 to 35 parts by weight on the basis of 100 parts by weight of the base resin.

7. The composition for manufacturing insulation materials of an electrical wire according to claim 1, wherein the co-crosslinking agent in the composition for manufacturing the first insulation coating layer and the second insulation coating layer is a cyanurate-based or methacrylate-based co-crosslinking agent, and is included at a content of 1 to 10 parts by weight on the basis of 100 parts by weight of the base resin.

8. The composition for manufacturing insulation materials of an electrical wire according to claim 7, wherein the cyanurate-based co-crosslinking agent is triallyl isocyanurate, and the methacrylate-based co-crosslinking agent is trimethylopropanemethacrylate.

9. The composition for manufacturing insulation materials of an electrical wire according to claim 1, wherein the composition for manufacturing the first insulation coating layer and the second insulation coating layer further comprises at least one material selected from the group consisting of:

a flame retardant which is at least one selected from the group consisting of antimony peroxide, magnesium hydroxide and aluminium hydroxide, and included at a content of 2 to 20 parts by weight on the basis of 100 parts by weight of the base resin;

a lubricant which is at least one material selected from the group consisting of polyolefin wax, paraffin wax, paraffin oil, steric acid, metallic soap, organic silicon, fatty acid ester, fatty acid amide, fatty alcohol and fatty acid, and included at a content of 2 to 5 parts by weight on the basis of 100 parts by weight of the base resin; and a processing aid which is at least one material selected from the group consisting of polyolefin wax, paraffin wax, paraffin oil, steric acid, metallic soap, organic silicon, fatty acid ester, fatty acid amide, fatty alcohol and fatty acid, and included at a content of 0.5 to 4 parts by weight on the basis of 100 parts by weight of the base resin.

10. An electrical wire that includes the multilayered insulation materials manufactured as defined in claim 1.

* * * * *